United States Patent [19]
Amemiya et al.

[11] Patent Number: 5,539,743
[45] Date of Patent: Jul. 23, 1996

[54] MULTIPLE ACCESS SYSTEM FOR COMMUNICATION NETWORK

[75] Inventors: Shigeo Amemiya; Hiroshi Takeo, both of Yokohama; Koji Tezuka, Kawasaki; Kazuo Iguchi, Yokohama, all of Japan

[73] Assignee: Fujitsu Limited, Kanagawa, Japan

[21] Appl. No.: 700,166

[22] PCT Filed: Sep. 17, 1990

[86] PCT No.: PCT/JP90/01183

§ 371 Date: May 17, 1991

§ 102(e) Date: May 17, 1991

[87] PCT Pub. No.: WO91/04623

PCT Pub. Date: Apr. 4, 1991

[30] Foreign Application Priority Data

Sep. 19, 1989 [JP] Japan .................................. 1-243058

[51] Int. Cl.$^6$ .................................................... H04J 3/02
[52] U.S. Cl. ....................... 370/85.1; 370/85.6; 340/825.5
[58] Field of Search ............................... 370/85.1, 108, 370/25.6, 85.9, 94.1, 110.1, 92, 118, 85.2, 85.3, 60, 60.1, 61, 94.2, 95.1, 95.2, 95.3, 85.7, 85.8, 84, 825.08; 379/243

[56] References Cited

U.S. PATENT DOCUMENTS

| | | | |
|---|---|---|---|
| 3,851,104 | 11/1974 | Willard | 370/84 |
| 4,466,001 | 8/1984 | Moore et al. | 340/825.08 |
| 4,709,364 | 11/1987 | Hasegawa et al. | 370/85.1 |
| 4,742,512 | 5/1988 | Akashi et al. | 370/56 |
| 4,848,771 | 7/1989 | Richardson | 273/237 |
| 4,910,766 | 3/1990 | Ogino et al. | 379/243 |
| 4,958,343 | 9/1990 | Abramovici et al. | 370/85.1 |
| 4,988,989 | 1/1991 | Goto | 370/85.1 |
| 4,998,244 | 3/1991 | Lee et al. | 370/85.1 |
| 5,001,707 | 3/1991 | Kositpaiboon et al. | 370/85.6 |
| 5,128,937 | 7/1992 | Khalil | 370/85.6 |

FOREIGN PATENT DOCUMENTS

| | | |
|---|---|---|
| 126435 | 10/1979 | Japan . |
| 220536 | 12/1983 | Japan . |
| 303535 | 12/1988 | Japan . |
| 2162722 | 2/1986 | United Kingdom . |

*Primary Examiner*—Douglas W. Olms
*Assistant Examiner*—Dang Ton

[57] ABSTRACT

In a multiple access system for a communication network in which a main station (M) is coupled to a plurality of sub stations (S1-Sn) via lines, each sub station (S1-Sn) comprises a data buffer (1) for storing data (DATA-TE) which is to be transmitted, and a request information forming part (2) for sending to the main station (M) transmission request information (REQ) which includes reservation information obtained based on a data quantity (IN) stored within the data buffer, and the main station (M) comprises a control part (5) for forming a time table (3) of a data transmission reservation time and a corresponding sub station number based on the reservation information included in the transmission request information from each sub station and for giving authority to transmit data to each sub station by transmitting a data transmission enable signal (TENO) to each sub station depending on the data transmission reservation time and the sub station number of the time table.

15 Claims, 23 Drawing Sheets

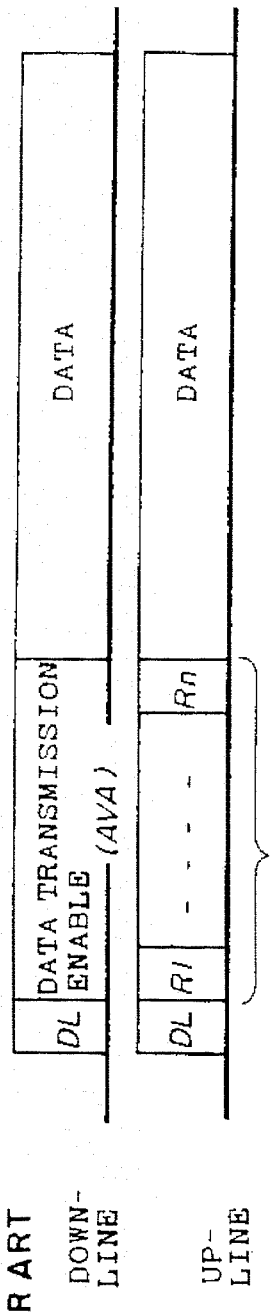
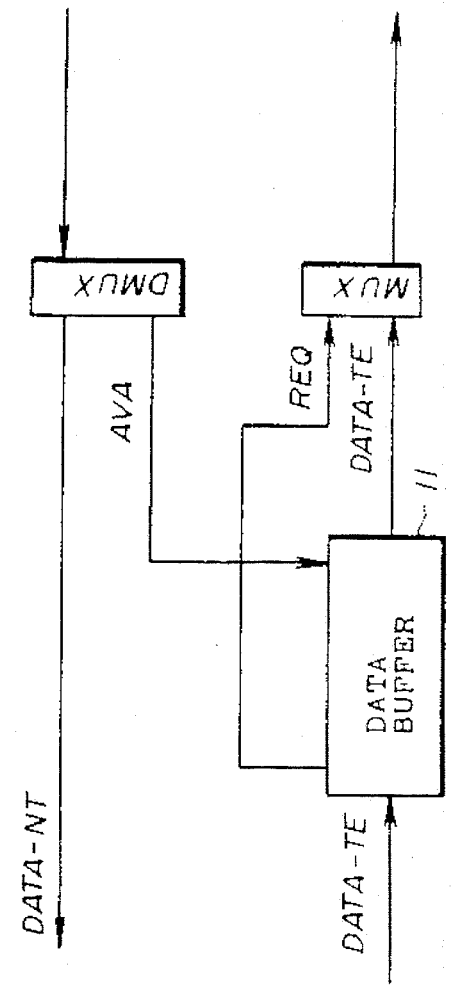
FIG.1A PRIOR ART
FIG.1B PRIOR ART
FIG.2 PRIOR ART

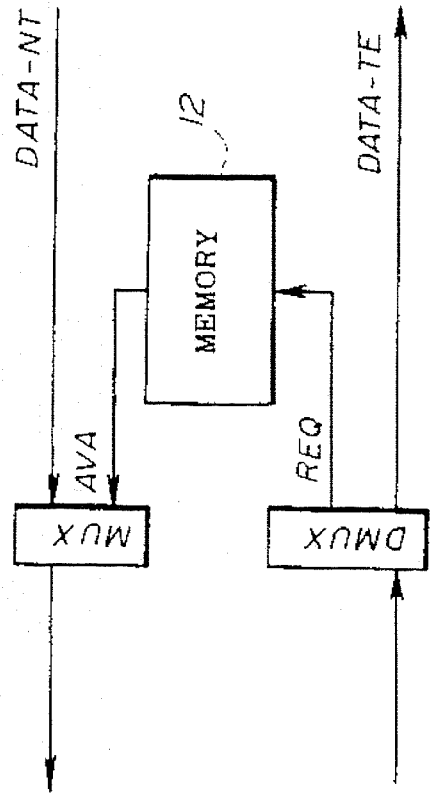
FIG. 3
PRIOR ART
FIG. 4A DOWN-LINE
FIG. 4B UP-LINE

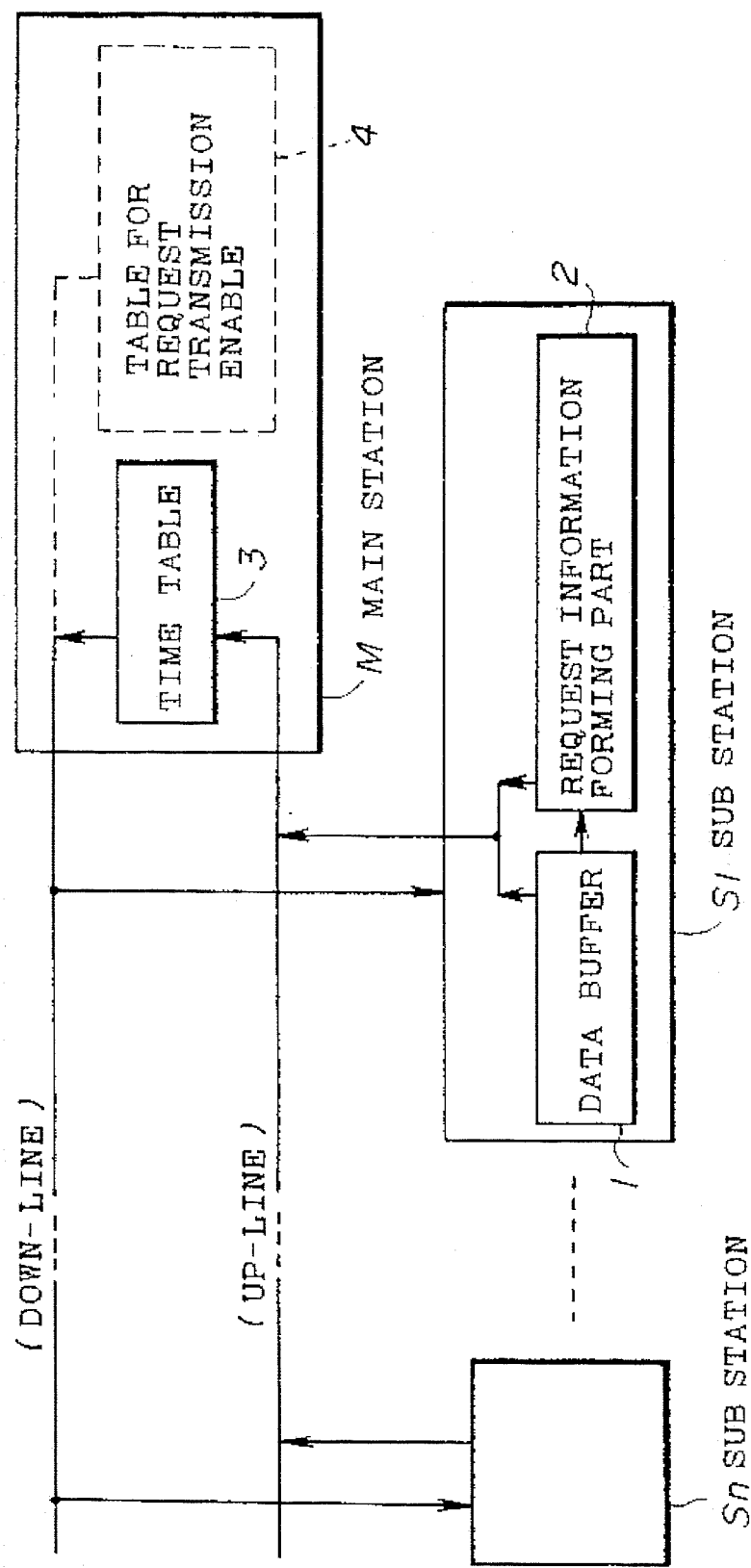

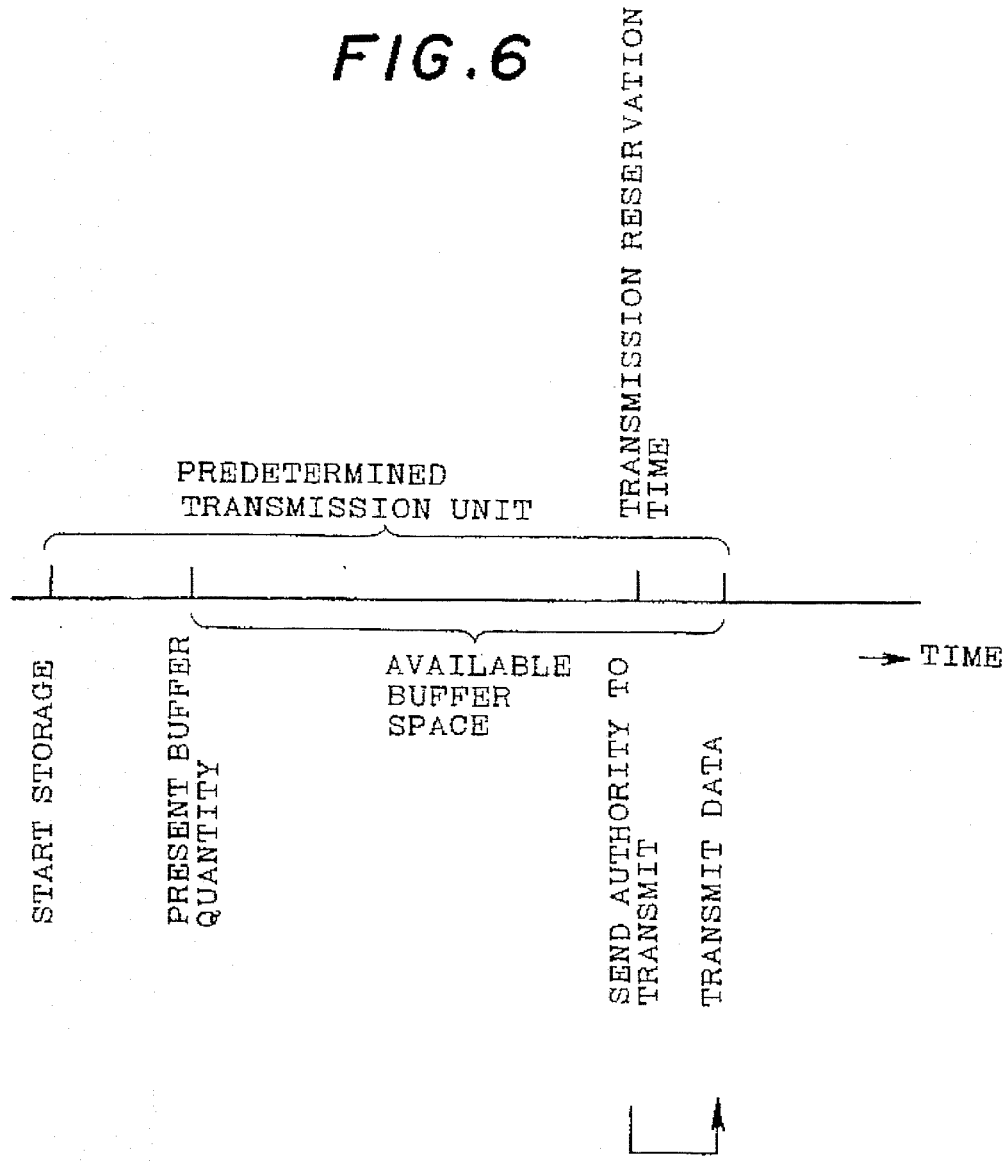

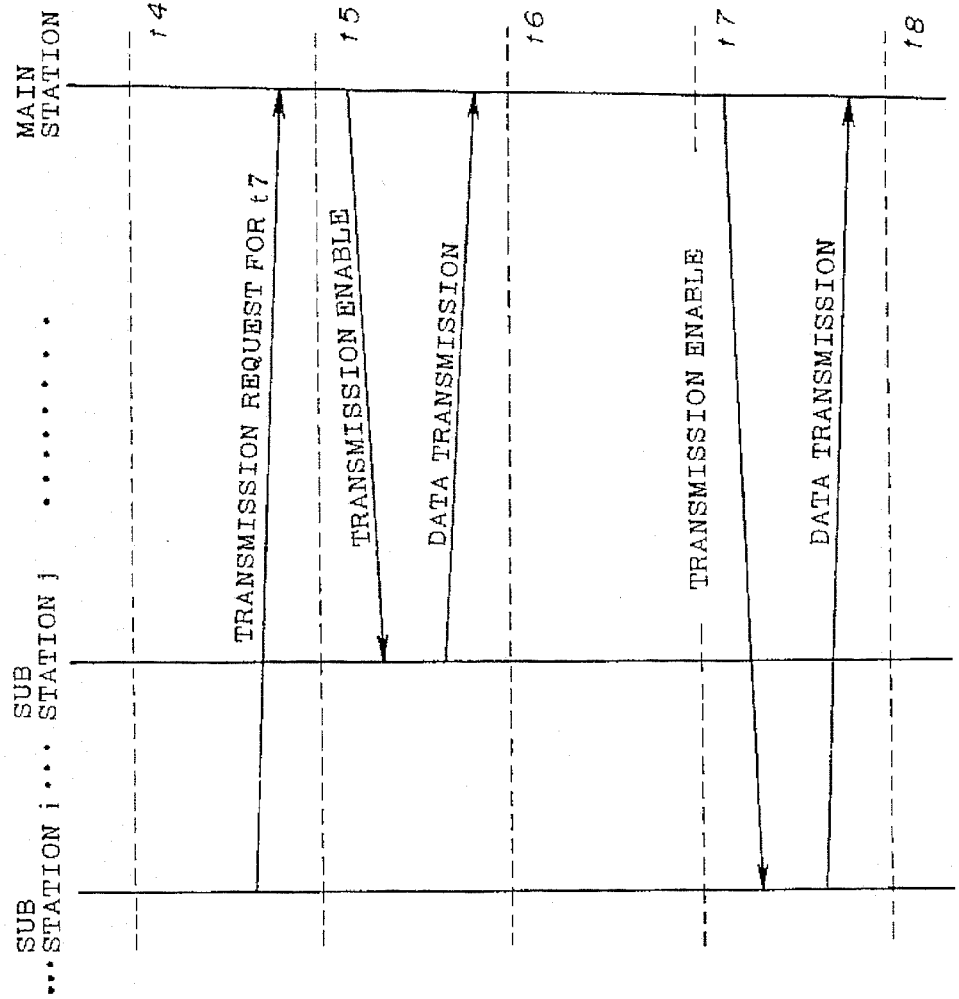

FIG.17

Diagram showing communication between SUB STATION i, SUB STATION j, and MAIN STATION across times t4–t8:
- t4→t5: TRANSMISSION REQUEST FOR t6 WITH PRIORTY 1 (from sub station j to main station)
- t5→t6: TRANSMISSION ENABLE
- t6: DATA TRANSMISSION
- t7: TRANSMISSION ENABLE
- t7→t8: DATA TRANSMISSION

FIG.18A

| TIME | RESERVATION | PRIORITY |
|---|---|---|
| t4 | NONE | |
| t5 | NONE | |
| t6 | SUB STATION j | 2 |
| t7 | NONE | |

FIG.18B

| TIME | RESERVATION | PRIORITY |
|---|---|---|
| t5 | NONE | |
| t6 | SUB STATION i | 1 |
| t7 | SUB STATION j | 2 |
| t8 | NONE | |

FIG.18C

| TIME | RESERVATION | PRIORITY |
|---|---|---|
| t6 | SUB STATION i | 1 |
| t7 | SUB STATION j | 2 |
| t8 | NONE | |
| t9 | NONE | |

FIG.18D

| TIME | RESERVATION | PRIORITY |
|---|---|---|
| t7 | SUB STATION j | 2 |
| t8 | NONE | |
| t9 | NONE | |
| t10 | NONE | |

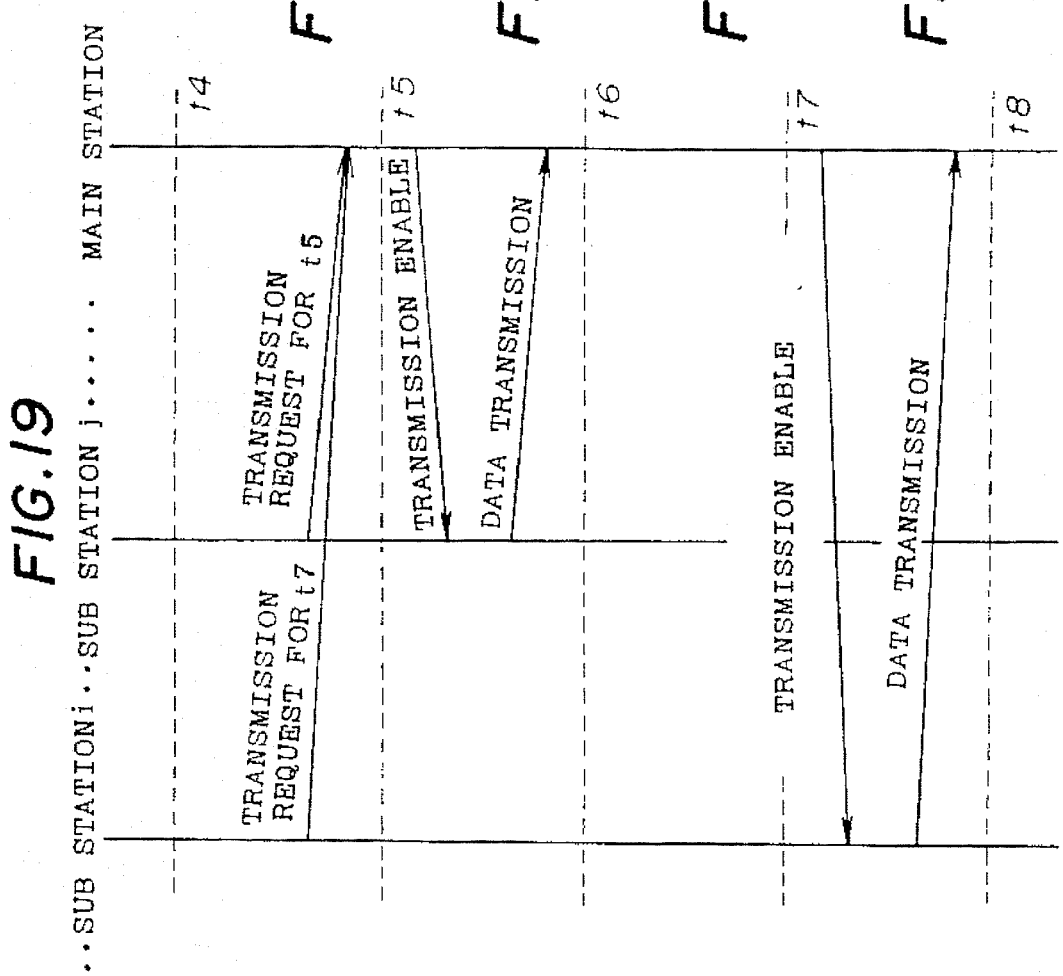

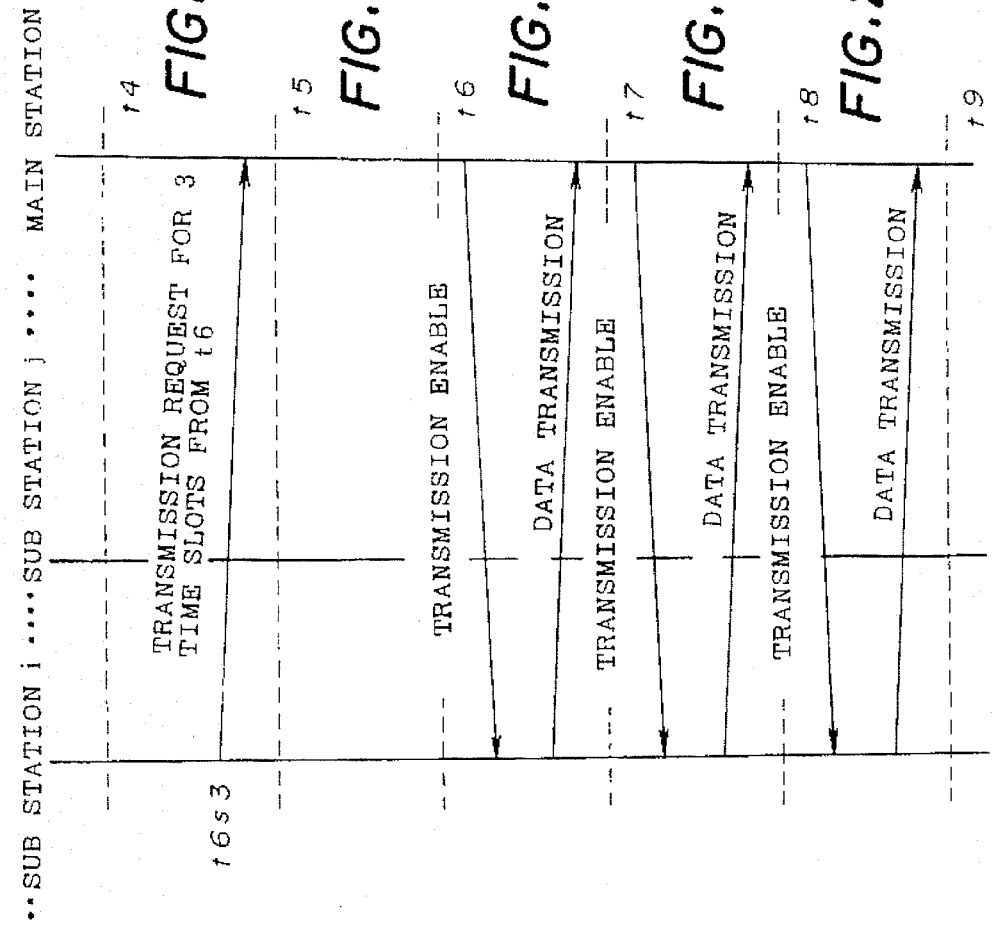

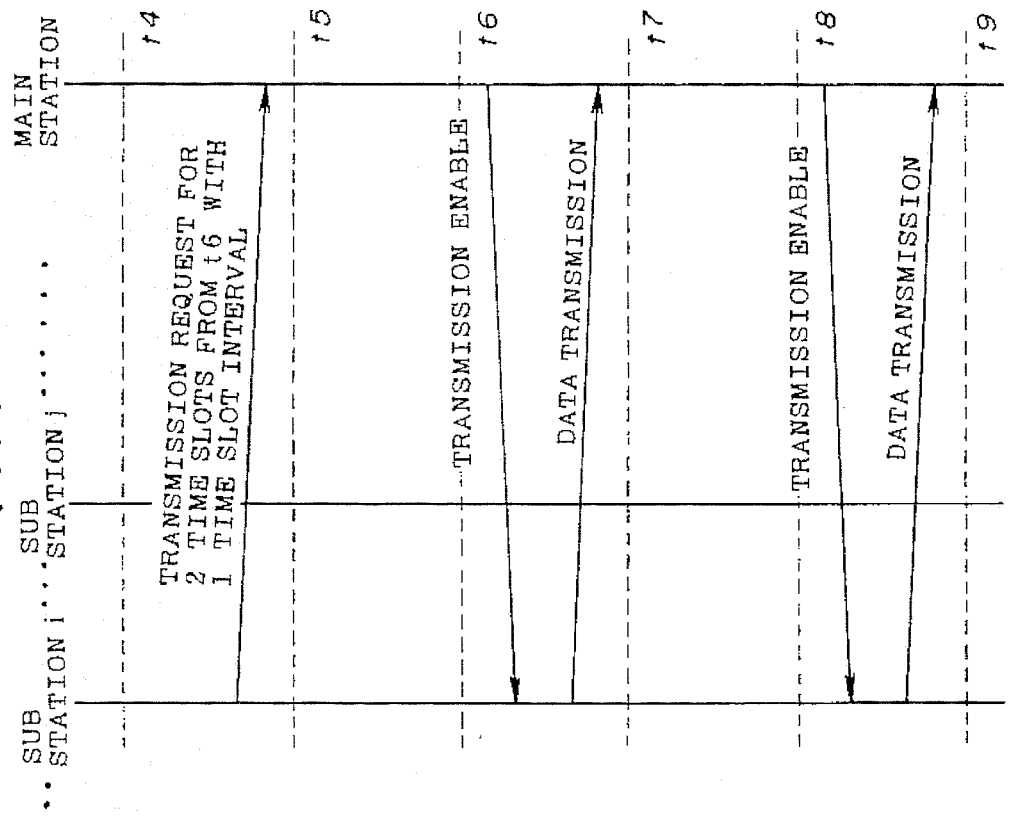

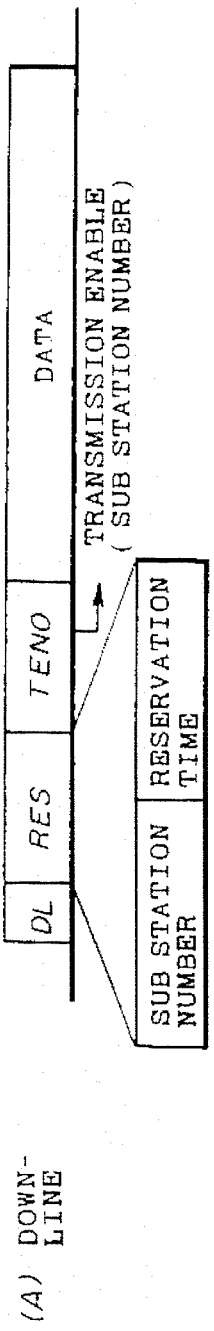
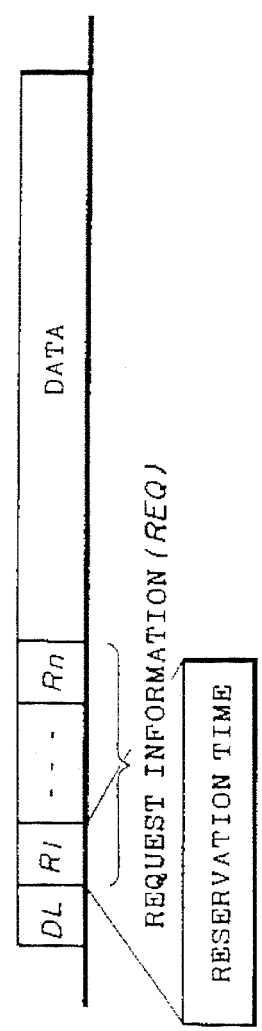
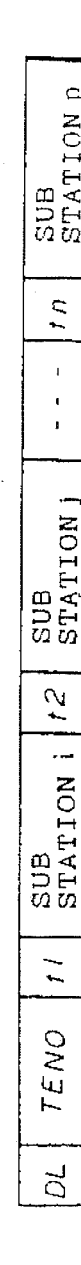
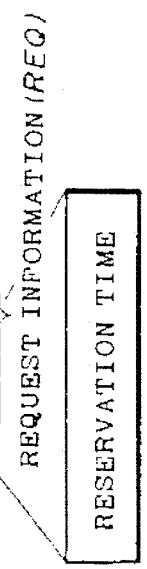
FIG.25A (A) DOWN-LINE
FIG.25B (B) UP-LINE
FIG.28A (A) DOWN-LINE RESERVATION STATE
FIG.28B (B) UP-LINE

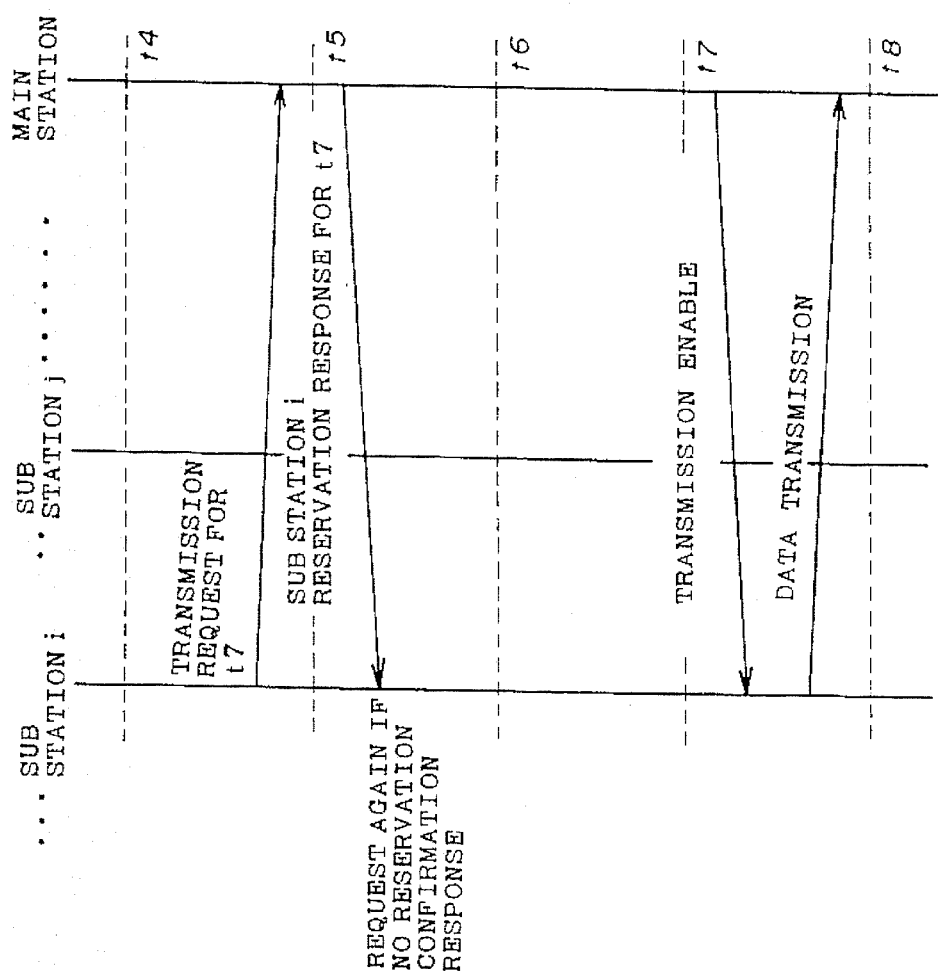

TIME TABLE

FIG.30A

| TIME | RESERVATION |
|---|---|
| t4 | NONE |
| t5 | NONE |
| t6 | SUB STATION j |
| t7 | SUB STATION k |

FIG.30B

| TIME | RESERVATION |
|---|---|
| t5 | NONE |
| t6 | SUB STATION j |
| t7 | SUB STATION k |
| t8 | NONE |

FIG.30C

| TIME | RESERVATION |
|---|---|
| t6 | SUB STATION j |
| t7 | SUB STATION k |
| t8 | SUB STATION i |
| t9 | NONE |

FIG.30D

| TIME | RESERVATION |
|---|---|
| t7 | SUB STATION k |
| t8 | SUB STATION i |
| t9 | NONE |
| t10 | NONE |

FIG.30E

| TIME | RESERVATION |
|---|---|
| t8 | SUB STATION i |
| t9 | NONE |
| t10 | NONE |
| t11 | NONE |

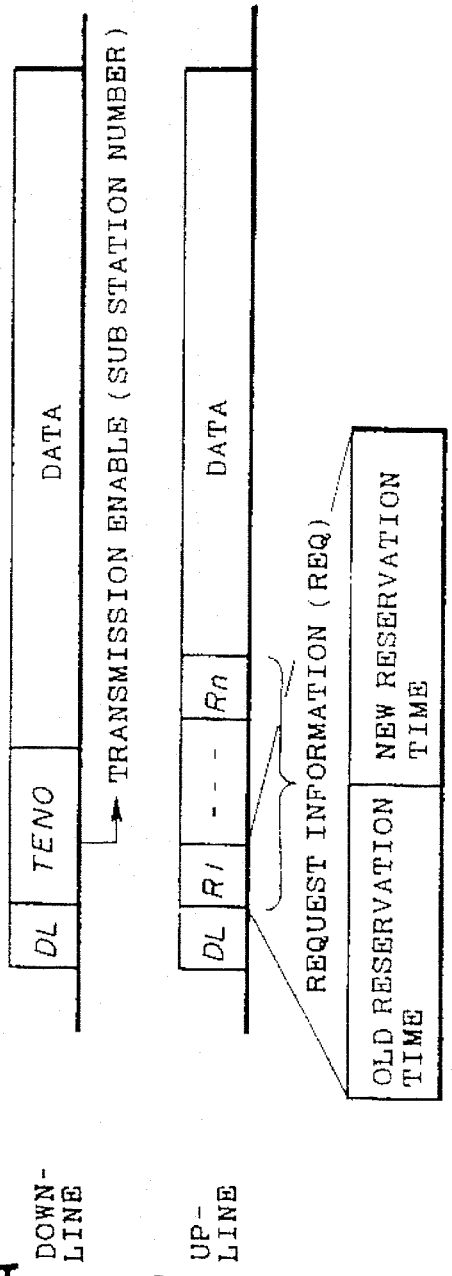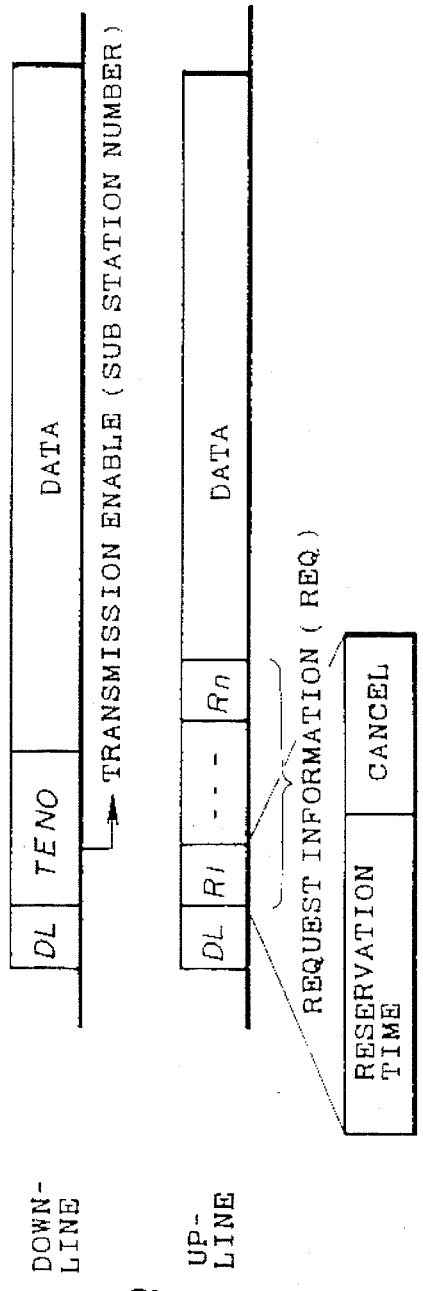

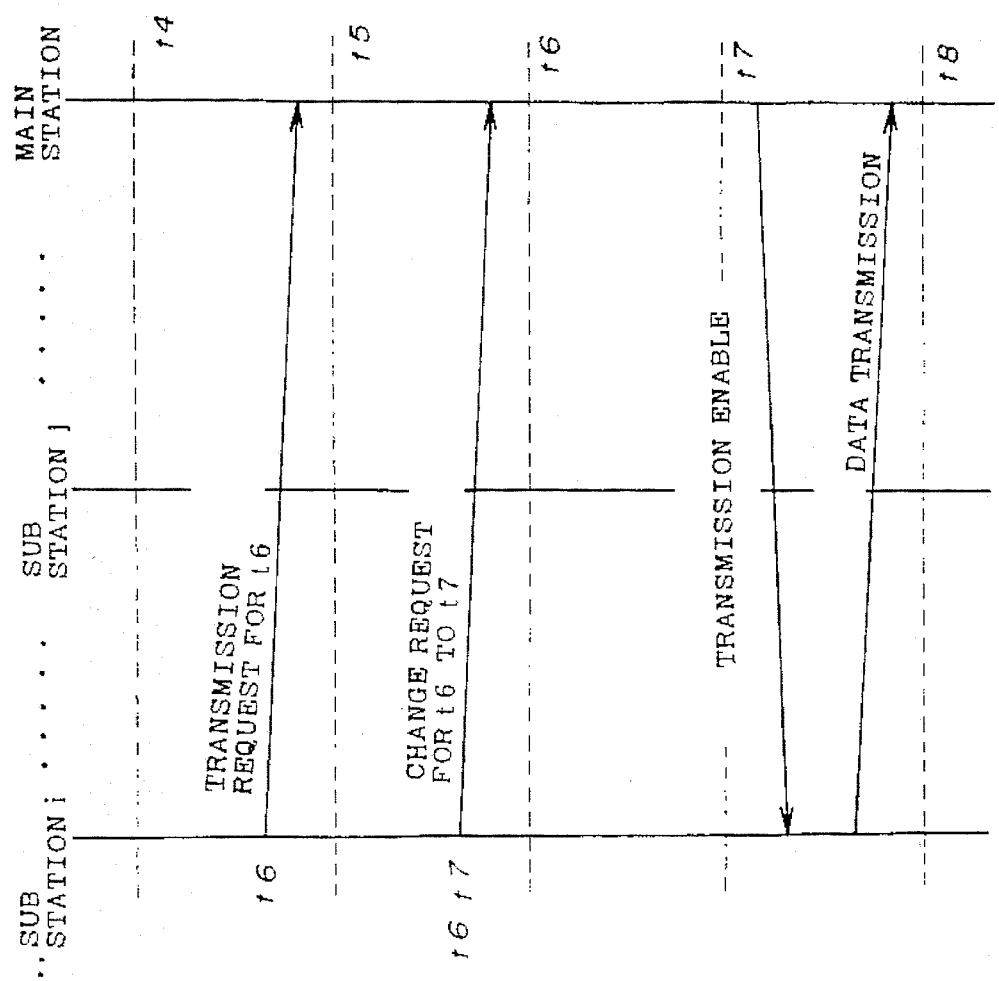

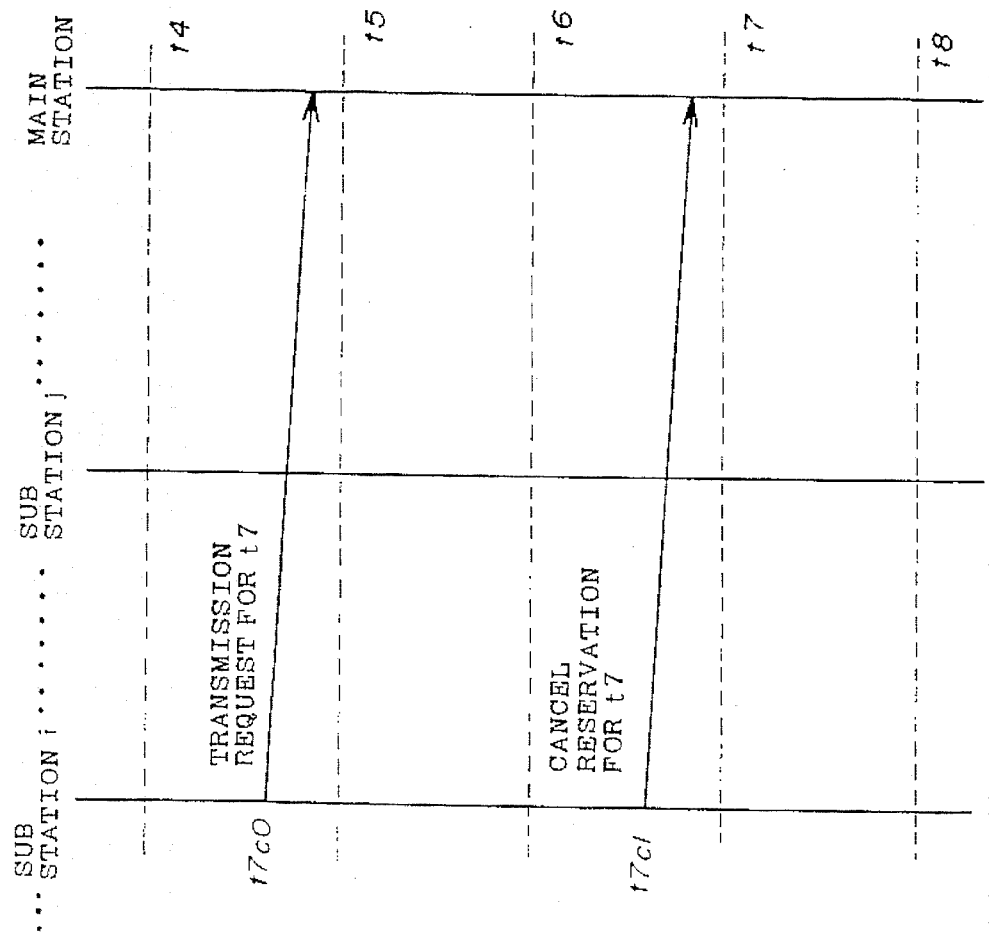

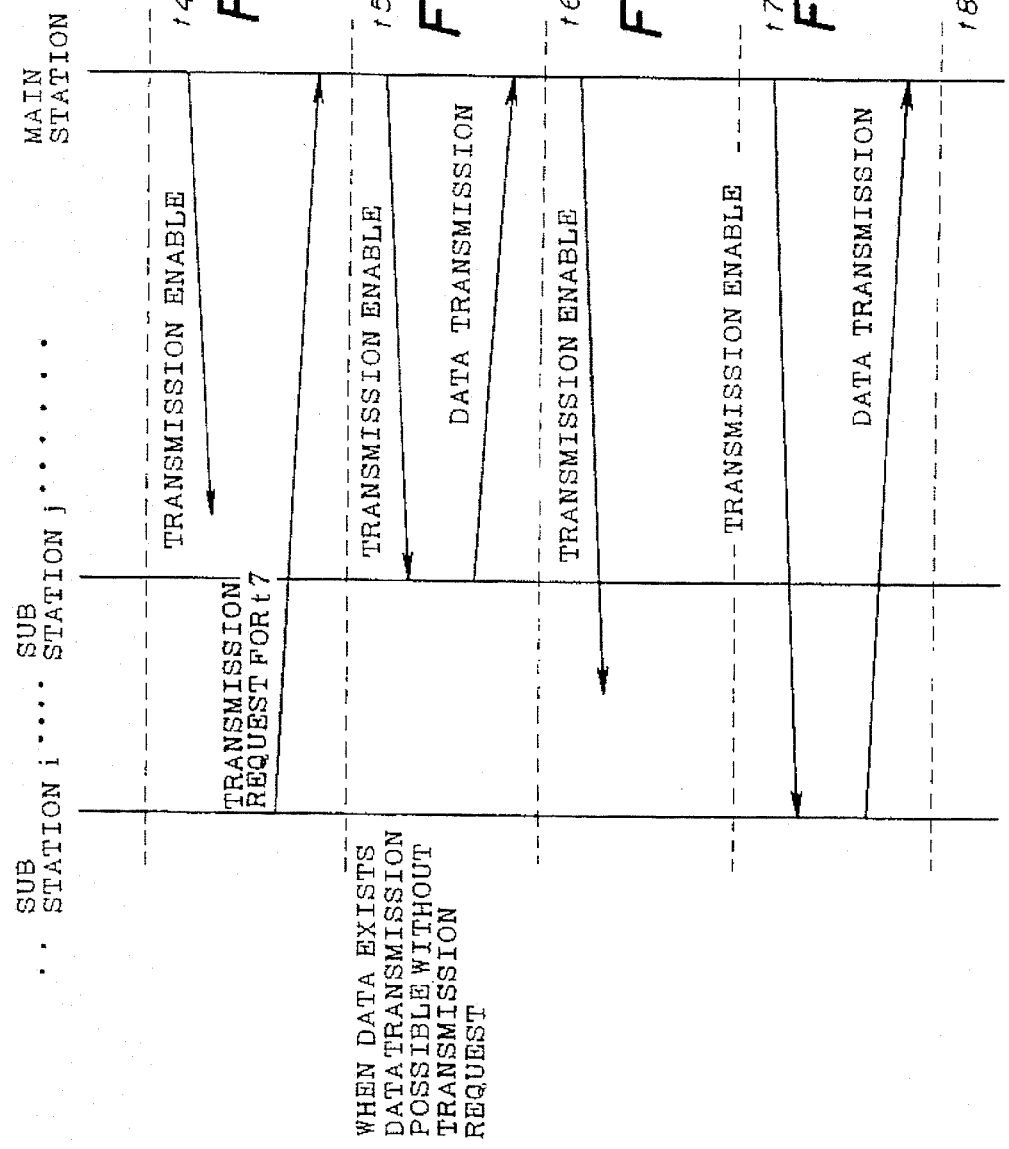

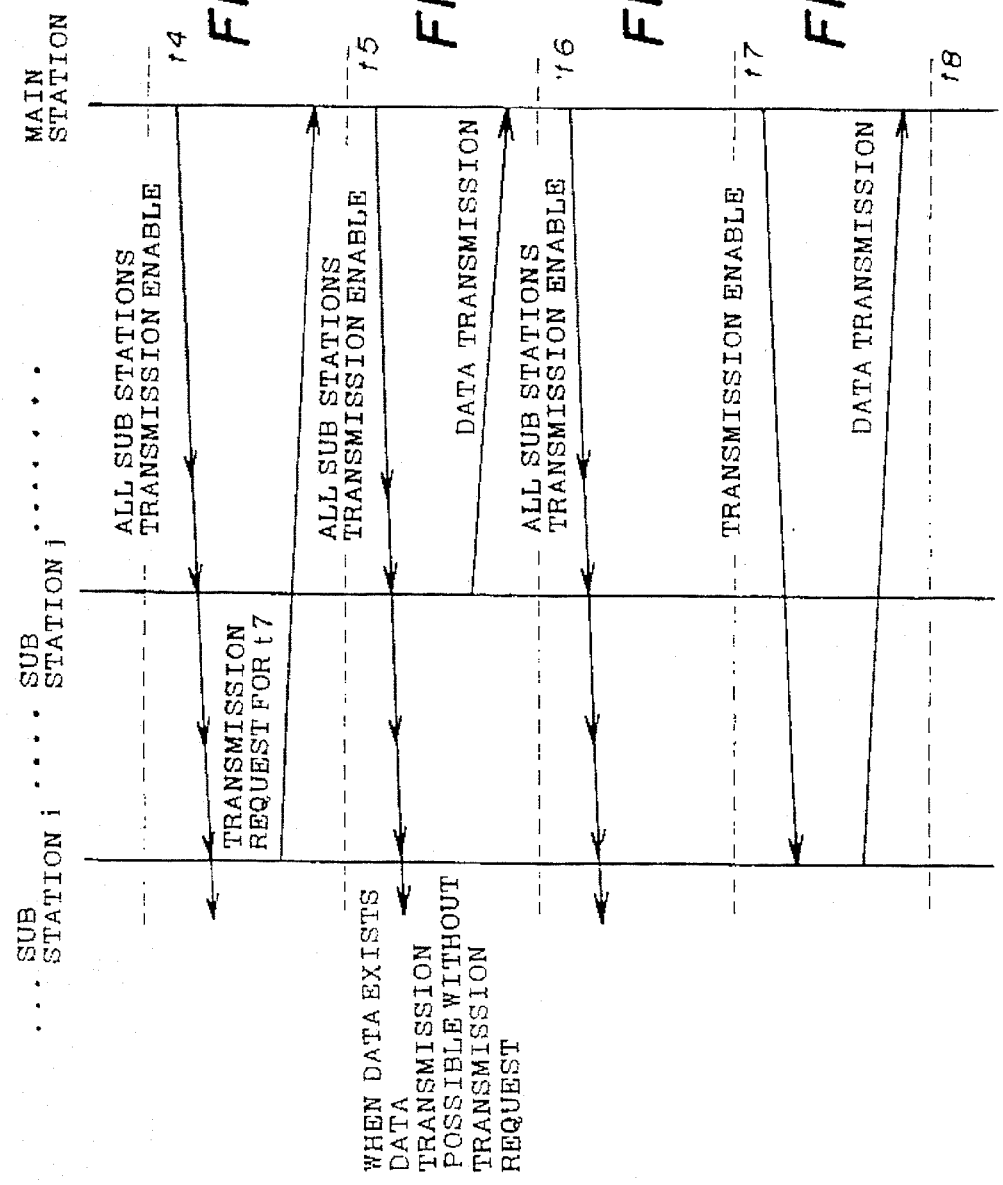

MULTIPLE ACCESS SYSTEM FOR COMMUNICATION NETWORK

TECHNICAL FIELD

The present invention generally relates to multiple access systems for communication networks, and more particularly to a multiple access system for a line of a communication network such as a LAN (local area network) and an ISDN (integrated services digital network) in which a main station is coupled to a plurality of sub stations.

BACKGROUND ART

Presently, a broadband ISDN, a broadband LAN and the like are expected as communication networks of the next generation which provide a broadband service such as image communication and high-speed data communication. In such a broadband service, the needs of the service are uncertain. Hence, an ATM (asynchronous transfer mode) has been proposed to transfer packets (cells) of fixed length at a high speed, in order to uniformly and efficiently transfer and switch the various kinds of services related to audio, video and data. The cell in this case is transferred in a burst form only when an information transfer request is generated, thereby enabling a communication which is not dependent on the speed. In addition, when multiplexing the data in units of cells as in the ATM, the competitive access becomes a problem because a plurality of sub stations within the communication network make access to a line.

For the above described reasons, there is a demand for a simple multiple access system which is efficient and does not introduce the competitive access.

One example of the conventional multiple access system is the request assign system employed in the LAN or the like. According to this request assign system, the sub station which has a transmission request makes the transmission request by adding a request flag on an up-line. The main station detects the request flags of all the sub stations, and assigns the authority to transmit according to a predetermined rule (for example, in the sequence in which the requests are detected). Information related to the authority to transmit is notified by a transmission enable flag on a down-line, and the sub station transmits data according to the content of this flag.

FIG. 1 shows an example of a data format in such a conventional system, FIG. 2 shows an example of a construction of the sub station, and FIG. 3 shows an example of the construction of the main station.

First, as shown in FIG. 1(B), request information REQ made up of bit regions R1 through Rn respectively corresponding to n terminals is added to an up-line data, and data transmission enable information AVA is added to a down-line data as shown in FIG. 1(A). In addition, DL indicates a beginning of the data format.

When such a data format is used and a transmission data DATA-TE amounting to a predetermined transmission unit is stored in a data buffer 11 of the sub station shown in FIG. 2, a request flag REQ becomes "1". A multiplexer part MUX multiplexes the request flag REQ to the transmission data DATA-TE and transmits it to the main station.

In this case, the request flag REQ is provided for each sub station, and a sub station i, for example, uses a request flag Ri as shown in FIG. 1(B).

At the main station, a demultiplexer part DMUX demultiplexes the request flags REQ from all of the sub stations as shown in FIG. 3, and a sub station number of the request flag REQ which is "1" is stored in a memory 12. The sub station numbers stored in the memory 12 are read as as the data transmission enable information AVA according to a predetermined rule (for example, in the sequence with which the numbers are stored), and is transmitted to the sub station by multiplexing it on the down-line in a multiplexer part MUX.

In the sub station shown in FIG. 2, the data transmission enable information AVA which is demultiplexed in a demultiplexer DMUX is read, and if this information AVA matches its own sub station number, the data buffer 11 is opened to transmit the information AVA to the main station by multiplexing it on the up-line in the multiplexer part MUX.

By carrying out the above described operation, the competitive access of the line from the plurality of sub stations is eliminated.

According to the conventional request assign system described above, there is a waiting time from a time when the data amounting to the predetermined transmission unit is stored in the data buffer 11 and the transmission request information is transmitted to a time when the authority to transmit data is assigned by the main station. Such a delay time becomes a problem in CBR (constant bit rate) services such as audio and video services.

DISCLOSURE OF THE INVENTION

The object of the present invention is to provide a novel and useful multiple access system for communication network in which the above described problems are overcome.

Another and more specific object of the present invention is to provide a multiple access system for a communication network in which a main station is coupled to a plurality of sub stations via lines, where each sub station has a data buffer for storing data to be transmitted and a request information forming part for transmitting to the main station transmission request information including reservation information which is obtained based on the data quantity stored within the data buffer, and the main station has a control part for forming a time table of data transmission reservation times based on the reservation information included in the transmission request information from each of the sub stations and for assigning the authority to transmit data by sending a data transmission enable signal to each of the sub stations depending on the data transmission reservation times in the time table. According to the present invention, it is possible to reduce the time from a time when the data is stored in the data buffer to a time when the authority to transmit data is obtained.

Other objects and further features of the present invention will be apparent from the following detailed description when read in conjunction with the accompanying drawings.

BRIEF DESCRIPTION OF THE DRAWINGS

FIG. 1 is a diagram for explaining a data format in a conventional request assign system;

FIG. 2 is a block diagram showing the construction of a sub station in the conventional system;

FIG. 3 is a block diagram showing the construction of a main station in the conventional system;

FIG. 4 is a diagram showing a data format for explaining the principle of the present invention;

FIG. 5 is a block diagram for explaining the principle of the present invention;

FIG. 6 is a diagram for explaining a transmission reservation time;

FIG. 7 is a diagram for explaining a data format in a first embodiment of the present invention;

FIG. 12 is a time chart for explaining an example of the operation of the first embodiment;

FIG. 13 is a diagram showing a state of a time table at times shown in FIG. 12;

FIG. 14 is a diagram for explaining a data format in a second embodiment of the present invention;

FIG. 17 is a time chart for explaining an example of the operation of a fifth embodiment of the present invention;

FIG. 18 is a diagram showing a state of a time table at times shown in FIG. 17;

FIG. 19 is a time chart for explaining an example of the operation of a sixth embodiment of the present invention;

FIG. 20 is a diagram showing a state of a time table at times shown in FIG. 19;

FIG. 21 is a time chart for explaining an example of the operation of a seventh embodiment of the present invention;

FIG. 22 is a diagram showing a state of a time table at times shown in FIG. 21;

FIG. 23 is a time chart for explaining an example of the operation of an eighth embodiment of the present invention;

FIG. 24 is a diagram showing a state of a time table at times shown in FIG. 23;

FIG. 25 is a diagram for explaining a data format in a ninth embodiment of the present invention;

FIG. 26 is a time chart for explaining an example of the operation of the ninth embodiment;

FIG. 27 is a diagram showing a state of a time table at times shown in FIG. 26;

FIG. 28 is a diagram for explaining a data format in a tenth embodiment of the present invention;

FIG. 30 is a diagram showing a state of a time table at times shown in FIG. 29;

FIG. 31 is a diagram for explaining a data format in an eleventh embodiment of the present invention;

FIG. 32 is a time chart for explaining an example of the operation of the eleventh embodiment;

FIG. 33 is a diagram showing a state of a time table at times shown in FIG. 32;

FIG. 34 is a diagram for explaining a data format in a twelfth embodiment of the present invention;

FIG. 35 is a time chart for explaining an example of the operation of the twelfth embodiment;

FIG. 36 is a diagram showing a state of a time table at times shown in FIG. 35;

FIG. 37 is a time chart for explaining an example of the operation of a thirteenth embodiment of the present invention;

FIG. 38 is a diagram showing a state of a time table at times shown in FIG. 37;

FIG. 39 is a time chart for explaining an example of the operation of a fourteenth embodiment of the present invention; and FIG. 40 is a diagram showing a state of a time table at times shown in FIG. 39.

BEST MODE OF CARRYING OUT THE INVENTION

FIGS. 4 and 5 are diagrams for explaining the principle of the present invention. In a data format shown in FIG. 4, a bit region indicating a time when the authority to transmit is to be obtained is provided as request information on an up-line as shown in FIG. 4(A), and a data transmission enable signal for enabling this authority to transmit is provided on a down-line as shown in FIG. 4(B).

And, as shown in FIG. 5, sub stations S1 through Sn calculate in a request information forming part 2 a time in which data amounting to a predetermined transmission unit is stored based on a data quantity stored within a data buffer 1. This calculated time is included in the request information as a reservation time together with a sub station number and is transmitted to a main station M on an up-line. FIG. 6 is a diagram for explaining a transmission reservation time.

At the main station M, requests are written into a time table 3 depending on the reservation time information included in the request information. When the reservation time written in the time table 3 comes, the main station M sends a data transmission enable signal to a sub station with a corresponding number via a down-line. Accordingly, the sub station outputs the data from the data buffer 1.

In addition, in the present invention, as indicated by a broken line, the main station M has a table 4 for request transmission enable, and the request information may be transmitted from the sub station depending on the table 4.

According to the present invention, it is possible to reserve the time of the data transmission by transmitting the reservation time information as the request information. Since the data transmission is enabled and the data is transmitted as soon as the preparations for the data transmission are made, it is possible to reduce the data transmission delay.

In this case, it is possible to transmit as the request information the number of transmission units corresponding to a period from a time when the request information is generated to a the reservation time, in place of the reservation time. In addition, it is possible to transmit the data speed and the available data space within the data buffer 1 of the sub station, calculate in the main station the reservation time when the data within the data buffer 1 amounting to a transmission unit will be stored based on the data speed and the available data space, and assign the authority to transmit at the calculated reservation time.

Furthermore, it is possible to transmit from the sub station additional priority information as the request information, and assign the authority to transmit depending on the priority information when the request information complete at the main station.

Figure 8:
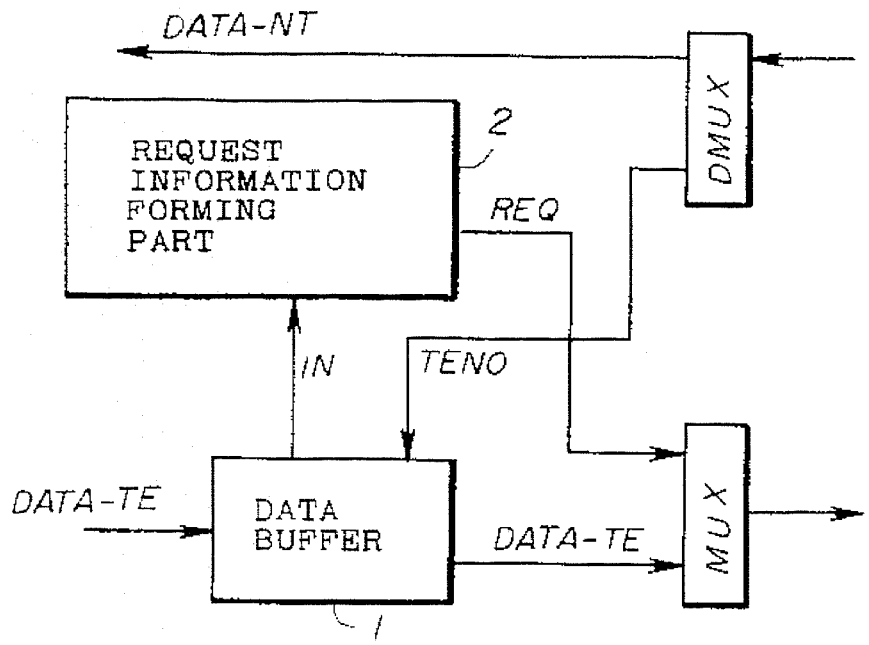
FIG. 8 is a block diagram showing the construction of a sub station in the first embodiment.
Figure 9:
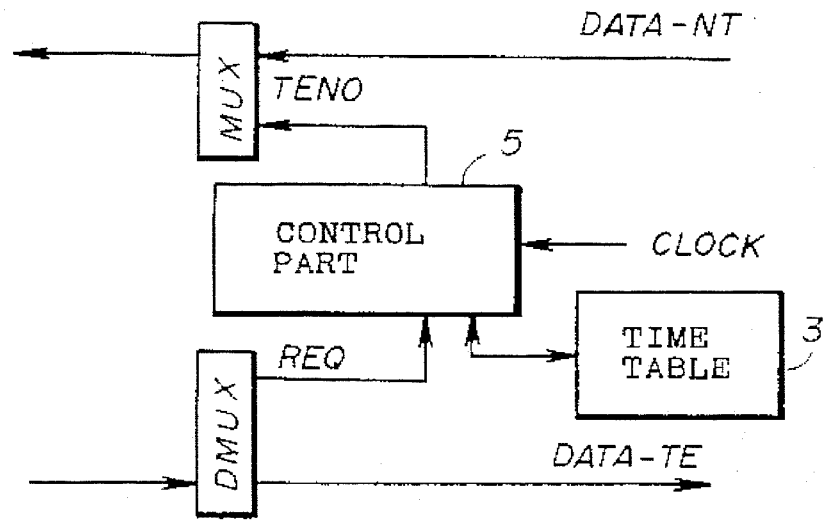
FIG. 9 is a block diagram showing the construction of a main station in the first embodiment.

FIG. 7 shows a data format, FIG. 8 shows the construction of the sub station, and FIG. 9 shows the construction of the main station in a first embodiment of the multiple access system for communication network according to the present invention.

As shown in FIG. 7(B), request information REQ made up of bit regions R1 through Rn respectively corresponding to n terminals is added to the up-line data format, and as shown in FIG. 7(A), a region TENO for writing a sub station number which is to be enabled of the data transmission is added to the down-line data format. Each of the bit regions R1 through Rn of the request information have more than one bit so that the number of bits is sufficient to input a request time. In addition, DL indicates the beginning of the data format.

At each of the sub stations S1 through Sn shown in FIG. 8, when a quantity IN of the transmission data DAATA-TE within the data buffer 1 is supplied to the request information forming part 2, the request information forming part 2 calculates a time in which the preparations for the data transmission can be made based on the data quantity IN.

In other words, as shown in FIG. 7, it is possible to calculate the reservation time when the data transmission can be made by subtracting the present data quantity IN from a data quantity amounting to a predetermined transmission unit (for example, it may be one transmission unit). The reservation time which is calculated in this manner is written in the bit region Ri of the request information REQ assigned to the sub station, and is transmitted to the main station via the multiplexer part MUX. The reservation time which is written may be an absolute time or a relative time.

At the main station M shown in FIG. 9, the demultiplexer part DMUX demultiplexes the request information REQ from all of the sub stations S1 through Sn, and the sub station number is written in the time table 3 which corresponds to the reservation time written in the request information REQ. When another sub station number are already written, the sub station number is written at the next time.

A control part 5 of the main station M reads the sub station number from the time table 3 which corresponds to the reservation time based on a clock, and outputs the number as data transmission enable information TENO. The information TENO is multiplexed to the main station data DATA-NT at the multiplexer MUX and transmitted to the sub station.

The above described operation is repeated for each sub station to carry out the data communication.

Figure 10:
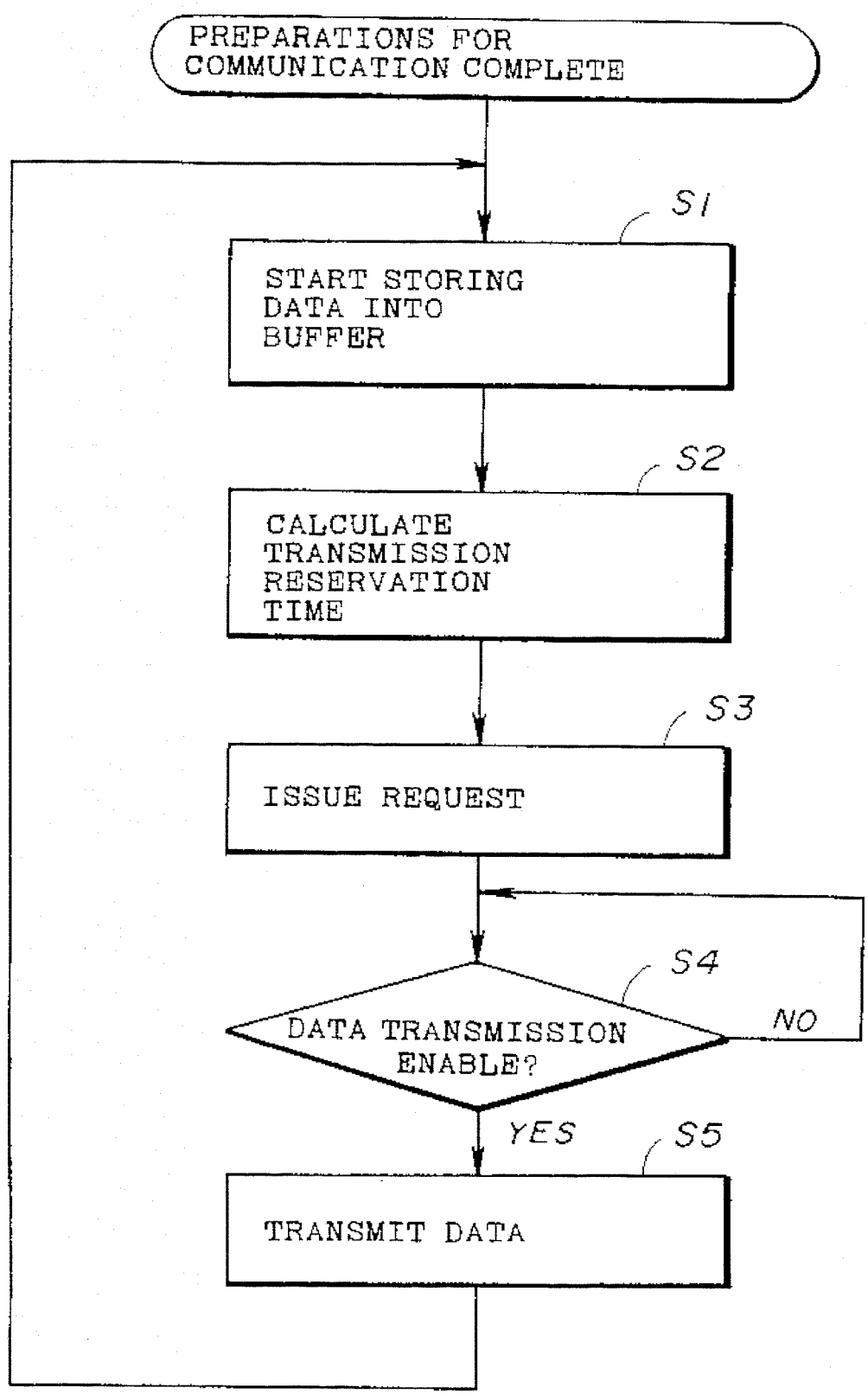
FIG. 10 is a flow chart showing an embodiment of the operation of a request information forming part of the first embodiment.

FIG. 10 is a flow chart showing an embodiment of the operation of the request information forming part 2 shown in FIG. 8. In FIG. 10, when preparations for the communication are completed in the sub station, a step S1 starts storing the transmission data DATA-TE into the data buffer 1. Next, a step S2 calculates the transmission reservation time in the request information forming part 2 based on the quantity IN of the transmission data DATA-TE within the data buffer 1, and a step S3 issues the request information REQ. A step S4 judges whether or not the buffer 1 received the data transmission enable information TENO from the main station based on the signal from the data buffer 1, and a step S5 transmits the transmission data DATA-TE via the multiplexer part MUX when the judgement result becomes YES.

For example, the step S2 calculates the transmission reservation time based on the following formula.

Transmission Reservation Time=[(Data Quantity of Transmission Unit)—(Data Qauntity Presently Stored in Buffer)]/(Data Storing Speed)

Figure 11:
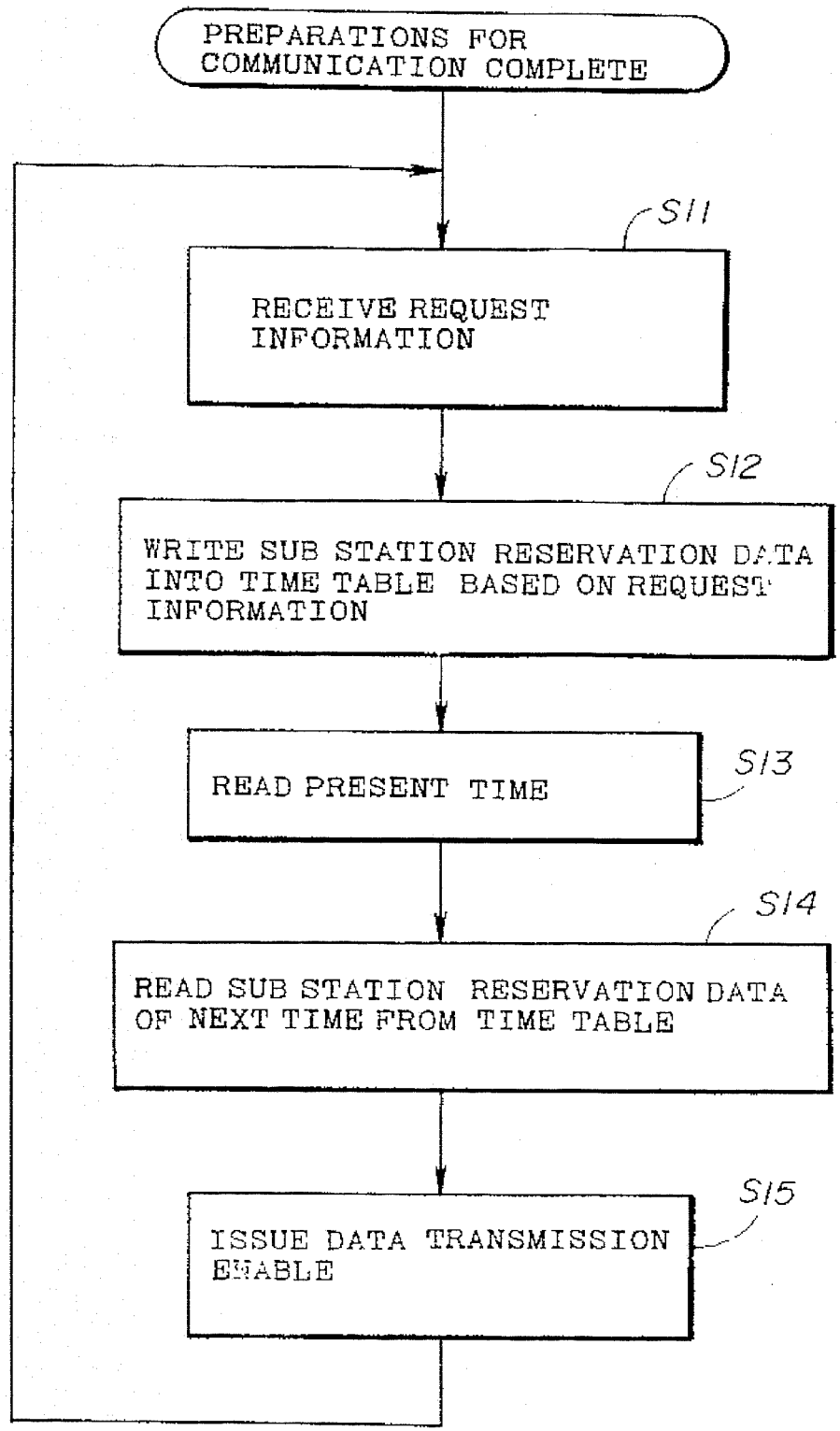
FIG. 11 is a flow chart showing an embodiment of the operation of a control part of the first embodiment.

FIG. 11 is a flow chart showing an embodiment of the operation of the control part 5 shown in FIG. 9. In FIG. 11, when the preparations for the communication are completed in the main station, a step S11 receives the request information from the sub station, and a step S12 writes the sub station reservation time in the time table 3 based on the request information. Next, a step S13 reads the present time, and a step S14 reads the sub station reservation information of the next time from the time table 3. A step S15 issues the data transmission enable information TENO with respect to the corresponding sub station based on the read sub station reservation information.

FIG. 12 is a time chart for explaining an example of the operation of the first embodiment, and FIGS. 13(A) through 13(D) show states of the time table 3 at times t4 through t7. For the sake of convenience, it is assumed that the time table 3 is in the state shown in FIG. 13(A) in the initial state at the time t4, and that the sub station i transmits to the main station the request information REQ which has the time t7 as the transmission reservation time as shown in FIG. 12. Hence, the state of the time table 3 changes to the state shown in FIG. 13(B) at the time t5. In addition, as shown in FIG. 12, the main station transmits the data transmission enable information TENO with respect to a sub station j at the time t5, and the sub station j transmits the transmission data DATA-TE in response to this data transmission enable information TENO. The time table 3 is in the state shown in FIG. 13(C) at the time t6, and is in the state shown in FIG. 13(D) at the time t7. Accordingly, as shown in FIG. 12, the main station transmits the data transmission enable information TENO with respect to the sub station i at the time t7, and the sub station i transmits the transmission data DATA-TE in response to this data transmission enable information TENO.

Figure 15:
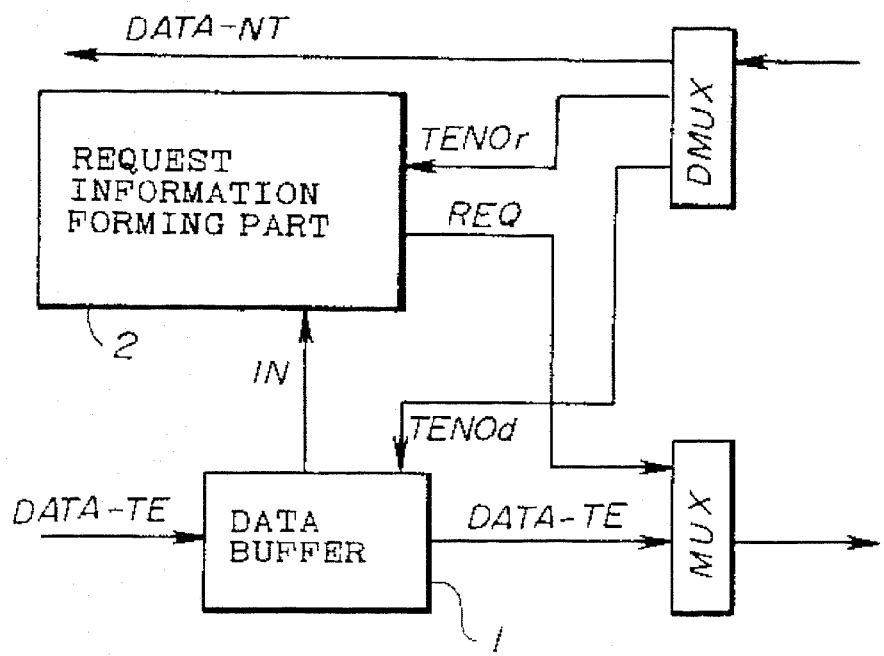
FIG. 15 is a block diagram showing the construction of a sub station in the second embodiment.
Figure 16:
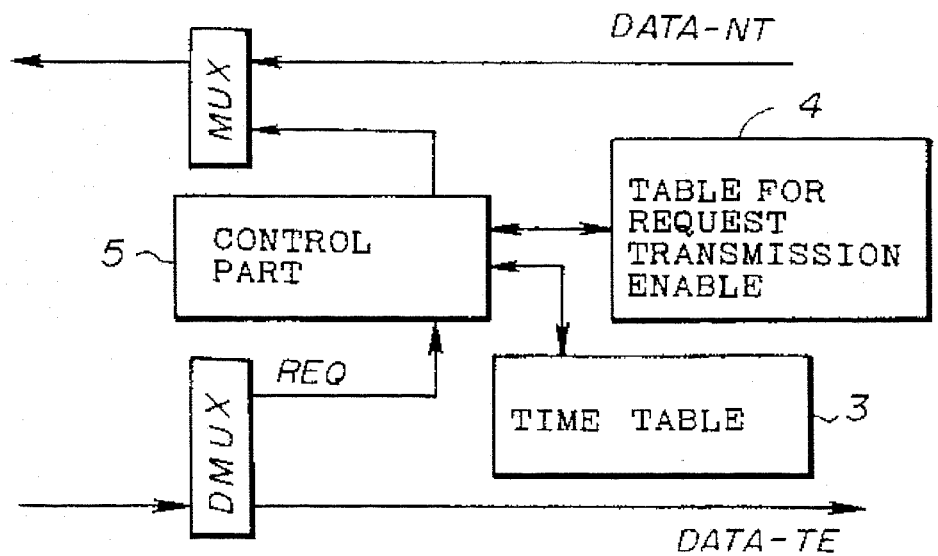
FIG. 16 is a block diagram showing the construction of a main station in the second embodiment.

FIG. 14 shows a data format, FIG. 15 shows the construction of the sub station, and FIG. 16 shows the construction of the main station in a second embodiment of the multiple access system for communication network according to the present invention. In FIGS. 15 and 16, those parts which are the same as those corresponding parts in FIGS. 8 and 9 are designated by the same reference numerals, and a description thereof will be omitted.

In this embodiment, a polling request system is used. As shown in FIG. 14(B), a single request information REQ is added to the up-line data format, and as shown in FIG. 14(A), a region TENOd for writing the sub station number which is to be enabled of the data transmission and a region TENOr for writing the sub station number which is to be enabled of the request transmission are added to the down-line data format. DL indicates the beginning of the data format.

First, at the main station, the sub station numbers are written into the region TENOr in the sequence arranged in a fixed table 4 which is prepared in advance for the request transmission enable, as shown in FIG. 16. The written sub station numbers are transmitted from the control part 5 and only the sub station which has the authority to transmit request can transmit the request information REQ.

In the request information forming part 2 of the sub station shown in FIG. 15 which receives the TENOr addresses thereto, the reservation time by which the preparations for the data transmission will be made is calculated from the data quantity IN of the transmission data DATA-TE within the data buffer 1, similarly as in the case of the first embodiment. This reservation time is written on the up-line as the request information REQ as shown in FIG. 14(B) and is transmitted to the main station via the multiplexer part MUX so as to write the reservation time and the sub station number in the time table 3 within the main station.

The operation which follows thereafter is similar to that of the first embodiment.

Next, a description will be given of a third embodiment of the multiple access system for communication network according to the present invention. In this embodiment, the request information forming part 2 transmits as the request information REQ the number of transmission units which corresponds to the transmission reservation time in place of the transmission reservation time. For example, when the frame is 8 kHz, 8 frames are transmitted instead of transmitting the time of 1 ms. On the other hand, the time table 3 also stores the number of transmission units and the sub station number in correspondence with each other. Otherwise, the operation is the same as that of the first or second embodiment. The number of transmission units corresponds to the number of time slots from the time when the transmission request is made to the reservation time, and corresponds to the number of cells in the case of the asynchronous transfer mode (ATM).

Next, a description will be given of a fourth embodiment of the multiple access system for communication network according to the present invention. In this embodiment, the request information forming part 2 transmits as the request information REQ the data quantity (or available space) within the data buffer 1 and the data speed in place of the transmission reservation time. At the main station, the control part 5 calculates the reservation time based on the following formula.

Reservation Time=[(Data Quantity Amounting to Transmission Unit)—(Data Quantity within Request Information)/(Data Speed)]

Otherwise, the operation is the same as that of the first or second embodiment.

Next, a description will be given of a fifth embodiment of the multiple access system for communication network according to the present invention. In this embodiment, the request information forming part 2 transmits as the request information REQ the priority together with the transmission reservation time. At the main station, the control part 5 shifts the transmission reservation time depending on the priority if necessary. Otherwise, the operation is the same as that of the first or second embodiment.

FIG. 17 shows a time chart for explaining an example of the operation of the fifth embodiment, and FIGS. 18(A) through 18(D) show states of the time table 3 at times t4 through t7. For the sake of convenience, it is assumed that the time table 3 is in the state shown in FIG. 18(A) in the initial state at the time t4, and that the sub station i transmits to the main station the request information REQ having the time t6 as the transmission reservation time and "1" as the priority as shown in FIG. 17. In this case, the reservation by the sub station j is already made for the time t6, but the reservation priority of the sub station j is "2" which is lower than the priority "1". Hence, the state of the time table 3 becomes as shown in FIG. 18(B) at the time t5. In other words, the reservation from the sub station i is made for the time t6, and the reservation from the sub station j is shifted from the time t6 to the time t7. Accordingly, as shown in FIGS. 17 and 18(C), the main station transmits the data transmission enable information TENO with respect to the sub station i at the time t6 and the sub station i transmits the transmission data DATA-TE in response to this data transmission enable information TENO. In addition, at the time t7, the main station transmits the data transmission enable information TENO with respect to the sub station j as shown in FIGS. 17 and 18(D), and the sub station j transmits the transmission data DATA-TE in response to this data transmission enable information TENO. Otherwise, the operation is the same as that of the first or second embodiment.

According to this embodiment, it is possible to make the delay time of the multiple access of the CBR service approximately zero by including the priority control in the authority to transmit and giving priority to the CBR service in which the delay time becomes a problem over the VBR (variable bit rate) service.

Next, a description will be given of a sixth embodiment of the multiple access system for communication network according to the present invention. In this embodiment, the main station can simultaneously receive reservations from a plurality of sub stations. FIG. 19 shows a time chart for explaining an example of the operation of the sixth embodiment, and FIGS. 20(A) through 20(D) show states of the time table 3 at times t4 through t7. For the sake of convenience, it is assumed that the time table 3 is in the state shown in FIG. 20(A) in the initial state at the time t4, and that sub stations i and j respectively transmit to the main station request information REQ having the times t7 and t5 as the transmission reservation times as shown in FIG. 19. As shown in FIGS. 19 and 20(B), the sub station j transmits the transmission data DATA-TE at the time t5 in response to the data transmission enable information TENO from the main station. In addition, as shown in FIGS. 19 and 20(D), the sub station i transmits the transmission data DATA-TE at the time t7 in response to the data transmission enable information TENO from the main station. Otherwise, the operation is the same as that of the first or second embodiment.

Next, a description will be given of a seventh embodiment of the multiple access system for communication network according to the present invention. In this embodiment, the request information forming part 2 transmits as the request information REQ the transmission reservation time and the data quantity which indicates how many time slots are required to transmit all the data. At the main station, the control part 5 writes in the time table the reservation which amounts to the time slots required for the transmission of all the data depending on the data quantity. Accordingly, one sub station can successively reserve a predetermined number of time slots.

FIG. 21 shows a time chart for explaining an example of the operation of the seventh embodiment, and FIGS. 22(A) through 22(E) show states of the time table 3 at times t4 through t7. For the sake of convenience, it is assumed that the time table 3 is in the state shown in FIG. 22(A) in the initial state at the time t4, and that the sub station i transmits to the main station the request information REQ which indicates the time t6 as the transmission reservation time and 3 time slots as the data quantity as shown in FIG. 21. Hence, during the 3 time slots from the time t6 to the time t8, the sub station i transmits the transmission data DATA-TE in response to the data transmission enable information TENO from the main station as shown in FIG. 21 and FIGS. 22(C) through 22(E). Otherwise, the operation is the same as that of the first or second embodiment.

Next, a description will be given of an eighth embodiment of the multiple access system for communication network according to the present invention. In this embodiment, the request information forming part 2 transmits as the request information REQ the transmission reservation time, the data quantity which indicates how many time slots are required to transmit all the data and the transmission interval of the transmission data DATA-TE. At the main station, the control part 5 writes in the time table 3 reservations amounting to the time slots required for the transmission of all the data with the specified transmission interval based on the data quantity and the transmission interval. Accordingly, one sub station can reserve a predetermined number of time slots with an arbitrary interval.

FIG. 23 shows a time chart for explaining an example of the operation of the eighth embodiment, and FIGS. 24(A) through 24(E) show states of the time table 3 at times t4 through t8. For the sake of convenience, it is assumed that the time table 3 is in the state shown in FIG. 24(A) in the initial state at the time t4, and that the sub station i transmits to the main station the request information REQ which indicates the time t6 as the reservation time, 2 time slots as the data quantity and 1 time slot as the transmission interval. Hence, as shown in FIGS. 23, 24(C) and 24(E), the sub station i transmits the transmission data DATA-TE in response to the data transmission enable information TENO from the main station from the time t6 for two time slots with an interval of 1 time slot. In other words, the transmission data DATA-TE is transmitted at the times t6 and t8. Otherwise, the operation is the same as that of the first or second embodiment.

Next, a description will be given of a ninth embodiment of the multiple access system for communication network according to the present invention. In this embodiment, it is possible to confirm the reservation state from the sub station. As shown in FIG. 25(B), the single request information REQ is added to the up-line data format, similarly to the first and second embodiments. On the other hand, a region RES for writing the reservation state and a region TENO for writing the sub station number which is to be enabled of the data transmission are added to the down-line data format as shown in FIG. 25(A). The sub station number which made the reservation in the time table 3 and the transmission reservation time thereof are written in the region RES by the control part 5 of the main station. Hence, the sub station which made the reservation can check the reservation state from the reservation response from the main station, that is, check whether or not the reservation was correctly made.

FIG. 26 shows a time chart for explaining an example of the operation of the ninth embodiment, and FIGS. 27(A) through 27(D) show states of the time table 3 at times t4 through t7. For the sake of convenience, it is assumed that the time table 3 is in the state shown in FIG. 27(A) in the initial state at the time t4, and that the sub station i transmits to the main station the request information REQ which has the time t7 as the reservation time as shown in FIG. 26. The control part 5 of the main station sends to the sub station the reservation state RES together with the data transmission enable information TENO at the time t5. Accordingly, the sub station i assumes that the reservation was not made correctly when no reservation response including the reservation state RES is received from the main station, and retransmits the same request information REQ to the main station. Otherwise, the operation is the same as that of the first or second embodiment.

Next, a description will be given of a tenth embodiment of the multiple access system for communication network according to the present invention. In this embodiment, the sub station can make an inquiry on the reservation state to the main station. As shown in FIG. 28(B), the single request information REQ is added to the up-line data format, similarly as in the case of the first or second embodiment. When the sub station makes the inquiry on the reservation state to the main station, the request information forming part 2 writes a predetermined code into the request information REQ in place of the transmission reservation time. When the control part 5 of the main station detects this predetermined code in the request information REQ, it is judged that there is an inquiry request on the reservation state, and the transmission reservation time within the time table 3 and the sub station number which specified the transmission reservation time are transmitted as the reservation state following the data transmission enable information TENO as shown in FIG. 18(A). As a result, the sub station can see the reservation state and reserve an available time.

Figure 29:
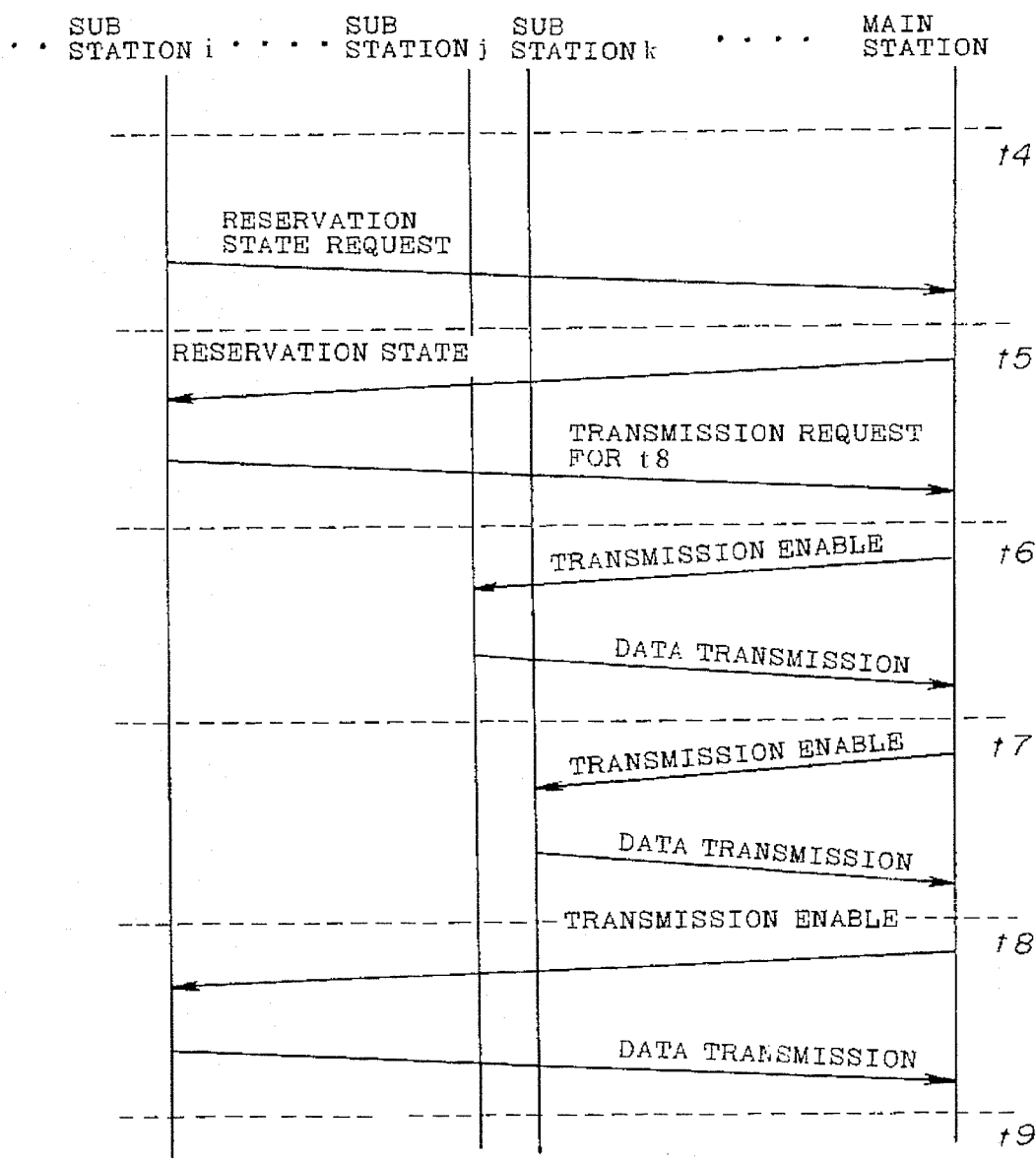
FIG. 29 is a time chart for explaining an example of the operation of the tenth embodiment.

FIG. 29 shows a time chart for explaining an example of the operation of the tenth embodiment, and FIGS. 30(A) through 30(E) show states of the time table 3 at times t4 through t8. For the sake of convenience, it is assumed that the time table 3 is in the state shown in FIG. 30(A) in the initial state at the time t4, and that the sub station i makes the inquiry request on the reservation state to the main station at the time t4. In this case, the main station sends the reservation state to the sub station i at the time t5, and the sub station i sees the reservation state shown in FIG. 30(B) and sends to the main station the request information REQ which has the time t8 as the reservation time. The operation thereafter is as shown in FIGS. 29 and 30(C) through 30(E). Otherwise, the operation is the same as that of the first or second embodiment.

Next, a description will be given of an eleventh embodiment of the multiple access system for communication network according to the present invention. In this embodiment, the reservation time can be changed from the sub station by notifying the main station. As shown in FIG. 31(B), the single request information REQ is added to the up-line data format, similarly as in the case of the first or second embodiment. However, two transmission reservation times can be written in this embodiment. In other words, the old reservation time is written in a first region, and a new reservation time is written in a second region. When no data is written in the second region, it is assumed that there is no change in the reservation time. As shown in FIG. 31(A), the down-line data format is the same as in the case of the first or second embodiment.

FIG. 32 shows a time chart for explaining an example of the operation of the eleventh embodiment, and FIGS. 33(A) through 33(D) show the states of the time table 3 at times t4 through t7. For the sake of convenience, it is assumed that the time table 3 is in the state shown in FIG. 33(A) in the initial state at the time t4, and that the sub station i sends to the main station the request information REQ which has the time t6 as the reservation time. In this case, the reservation time t6 is written in the first region. It is also assumed that the sub station i thereafter changes the reservation time from the time t6 to the time t7 at the time t5. In this case, the new reservation time t7 is written in the second region. When the control part 5 of the main station detects that the new reservation time is written in the second region, the control part 5 changes the time table 3 from the state shown in FIG. 33(B) to the state shown in FIG. 33(C). Accordingly, as shown in FIGS. 32 and 33(D), the sub station i transmits the transmission data DATA-TE at the time t7 in response to the data transmission enable information TENO from the main station. Otherwise, the operation is the same as that of the first or second embodiment.

Next, a description will be given of a twelfth embodiment of the multiple access system for communication network according to the present invention. In this embodiment, the sub station can cancel the reservation time by notifying the main station. As shown in FIG. 34(B), the single request information REQ is added to the up-line data format, similarly as in the case of the first or second embodiment. But in this embodiment, the cancel information can be written in addition to the transmission reservation time. In other words, the reservation time is written in the first region, and the cancel information is written in the second region. When no cancel information is written in the second region, it is assumed that the reservation time has not been cancelled. As shown in FIG. 34(A), the down-line data format is the same as that of the first or second embodiment.

FIG. 35 shows a time chart for explaining an example of the operation of the twelfth embodiment, and FIGS. 36(A) through 36(D) show the states of the time table 3 at times t4 through t7. For the sake of convenience, it is assumed that the time table 3 is in the state shown in FIG. 36(A) in the initial state at the time t4, and that the sub station i sends to the main station the request information REQ which has the time t7 as the reservation time as shown in FIG. 35. In this case, the reservation time t7 is written in the first region. In addition, the sub station i thereafter cancels the reservation time t7 at the time t6. The cancel information for cancelling the reservation time is written in the second region. When the control part 5 of the main station detects that the cancel information is written in the second region, the control part 5 changes the state of the time table 3 from the state shown in FIG. 36(C) to the state shown in FIG. 36(D). As a result, the reservation made at the time t4 is cancelled. Otherwise, the operation is the same as that of the first or second embodiment.

Next, a description will be given of a thirteenth embodiment of the multiple access system for communication network according to the present invention. In this embodiment, the main station gives the authority to transmit to an arbitrary sub station during a time when no request information is received from the sub station. The arbitrary sub station may be selected in a predetermined sequence or at random.

FIG. 37 shows a time chart for explaining an example of the operation of the thirteenth embodiment, and FIGS. 38(A) through 38(D) show states of the time table 3 at times t4 through t7. As shown in FIG. 37, during the time when the main station does not receive the request information REQ from the sub station, the control part 5 sends the data transmission enable information TENO to an arbitrary sub station. Otherwise, the operation is the same as that of the first or second embodiment.

Next, a description will be given of a fourteenth embodiment of the multiple access system for communication network according to the present invention. In this embodiment, the main station gives the authority to transmit to a plurality of sub stations during a time when no request information REQ is received from the sub station.

FIG. 39 shows a time chart for explaining an example of the operation of the fourteenth embodiment, and FIGS. 40(A) through 40(D) show the states of the time table 3 at times t4 through t7. As shown in FIG. 39, the control part 5 sends the data transmission enable information TENO to a plurality of sub stations when the main station receives no request information REQ from the sub station. Of course, a known collision control, a retransmission control or the like is required because the data transmitted from the plurality of sub stations may make a collision. Otherwise, the operation is the same as that of the first or second embodiment.

Of course, the above described embodiments may be combined.

Further, the present invention is not limited to these embodiments, but various variations and modifications may be made without departing from the scope of the present invention.

INDUSTRIAL APPLICABILITY

As described above, according to the multiple access system for communication network of the present invention, a time when the available space within a data buffer of a sub station will become full is predicted when the available space exists, and data transmission request information which reserves this predicted time as the reservation time is sent to the main station. The main station gives the authority to transmit data to the sub station when the reservation time comes. Hence, the present invention is extremely useful from the practical point of view in that it is possible to reduce the waiting time from the time when the data is fully stored in the data buffer to the time when the authority to transmit data is obtained.

We claim:

1. A multiple access system for a communication network, comprising a main station and a plurality of sub stations coupled to said main station via transmission lines for exchanging data, each sub station comprising a data buffer for storing data (DATA-TE) which is to be transmitted, and a request information forming part for sending to said main station, via said transmission lines, transmission request information which includes reservation information, which is based on a data quantity stored within said buffer, and includes a requested communication start time for data transmission;

said main station comprising a control part for forming a time table of a data transmission reservation time and a corresponding sub station number based on the reservation information included in the transmission request information received from each sub station via said transmission lines, and for giving authority to transmit data to each sub station, respectively, by transmitting a data transmission enable signal (TENO) to each sub station via said transmission lines depending on the data transmission reservation time and the sub station number in said time table.

2. The multiple access system for the communication network as in claim 1, wherein said main station further comprises a request transmission enable table for storing a sub station number of a sub station which is to be enabled for data transmission in response to said transmission request information, and at said start time said control part sends said sub station number of said sub station to be enabled to said plurality of sub stations together with said data transmission enable signal (TENO) to give authority to transmit data only to the sub station having said sub station number.

3. The multiple access system for the communication network as claimed in claim 1, wherein said request information forming part sends to said main station, as said reservation information time, information related to a time it takes to store data amounting to a predetermined transmission unit in said data buffer from a present data quantity within said data buffer.

4. The multiple access system for the communication network as claimed in claim 1, wherein said request information forming part sends to said main station, as said reservation information, a number of transmission units corresponding to a period from a time when said transmission request information is generated to said data transmission reservation time.

5. The multiple access system for the communication network as claimed in claim 1, wherein said request information forming part sends to said main station, as said reservation information, a data speed and one of a data quantity within said data buffer and an available space within said data buffer, and said control part forms said time table by calculating said data transmission reservation time based on said reservation information.

6. The multiple access system for the communication network as claimed in claim 1, wherein said request information forming part sends to said main station said transmission request information by adding priority information thereto, and said control part shifts the data transmission reservation time of said time table if necessary based on said priority information.

7. The multiple access system for the communication network as claimed in claim 1, wherein said control part forms said time table by receiving the reservation information from at least arbitrary ones of said plurality of sub stations simultaneously.

8. The multiple access system for the communication network as claimed in claim 1, wherein said request information forming part sends to said main station said transmission request information by adding thereto a total data quantity of the data (DATA-TE) which is to be transmitted, and said control part forms said time table so as to reserve successive time slots amounting to said total data quantity based on said reservation information.

9. The multiple access system for the communication network as claimed in claim 1, wherein said request information forming part transmits to said main station said transmission request information by adding thereto a total data quantity and a transmission interval of the data (DATA-TE) which is to be transmitted, and said control part forms said time table so as to reserve time slots amounting to said total data quantity with said transmission interval based on said reservation information.

10. The multiple access system for the communication network as claimed in claim 1, wherein said control part sends to said sub stations said data transmission enable signal (TENO) by adding thereto said reservation information.

11. The multiple access system for the communication network as claimed in claim 1, wherein said control part sends to a sub station said data transmission enable signal (TENO) by adding thereto said reservation information when an inquiry request on the reservation information is received from said plurality of sub stations.

12. The multiple access system for the communication network as claimed in claim 1, wherein said request forming part sends to said main station said transmission request information by adding thereto new reservation information after changing of the reservation, and said control part (5) changes said time table based on said new reservation information.

13. The multiple access system for the communication network as claimed in claim 1, wherein said request forming part sends to said main station said transmission request information by adding thereto cancel information indicating a cancelling of the reservation, and said control part cancels corresponding reservation information of said time table based on said cancel information.

14. The multiple access system for the communication network as claimed in claim 1, wherein said control part sends the data transmission enable signal (TENO) to an arbitrary sub station to give this arbitrary sub station the authority to transmit data during a period in which no transmission request information is received from said sub stations.

15. The multiple access system for the communication network as claimed in claim 1, wherein said control part sends the data transmission enable signal (TENO) to at least arbitrary ones of said plurality of sub stations simultaneously to give the authority to transmit data to said sub stations during a period in which no transmission request information is received from said sub stations.

* * * * *